United States Patent [19]

Ikeda et al.

[11] 4,125,323

[45] Nov. 14, 1978

[54] ELECTROPHOTOGRAPHIC COPYING MACHINE OF A MULTI-SIZE COPYING TYPE

[75] Inventors: Hiroshi Ikeda, Aichi; Yasuhiko Doi, Toyokawa; Masamichi Hayashi, Aichi, all of Japan

[73] Assignee: Minolta Camera Kabushiki Kaisha, Osaka, Japan

[21] Appl. No.: 799,128

[22] Filed: May 20, 1977

[30] Foreign Application Priority Data

May 31, 1976 [JP] Japan .................................. 51-63306

[51] Int. Cl.[2] ...................... G03G 15/00; G03B 27/70

[52] U.S. Cl. .......................................... 355/8; 355/60; 355/71

[58] Field of Search .................... 355/60, 71, 8, 50, 51, 355/65, 66

[56] References Cited

U.S. PATENT DOCUMENTS

| | | | |
|---|---|---|---|
| 3,731,611 | 5/1973 | Aasen et al. | 355/71 X |
| 3,771,867 | 11/1973 | Moser | 355/71X |
| 3,914,046 | 10/1975 | Tanaka et al. | 355/60 X |
| 3,917,393 | 11/1975 | Nier | 355/8 X |
| 3,967,895 | 7/1976 | Crook | 355/71 X |

*Primary Examiner*—Richard A. Wintercorn

[57] ABSTRACT

The electrophotographic copying machine of the present disclosure includes a slit mechanism having two different forms of slits, an optical device to project the image of the original to be copied onto a photoreceptor surface a shifting mechanism for shifting the optical device between a first position suitable for performing an equal size copying operation and a second position suitable for performing a different size copying operation, such as a reduced size copying operation. During the equal size copying operation, the slit mechanism provides a slit having a large size, while during the other size copying operation, for example, a reduced size copying operation, the slit mechanism provides a slit having a different size, for example a small size, so as to maintain the distribution of the amount of exposure on the photoreceptor surface in a predetermined distribution regardless of the type of copying operation.

12 Claims, 11 Drawing Figures

$$\begin{cases} V_1\beta_1 = V_2\beta_2 \\ \omega = f(\beta_1 - \beta_2) \\ \phi = \frac{1}{2} f \left| \frac{(1+\beta_1)^2}{\beta_1} - \frac{(1+\beta)^2}{\beta_2} \right| \end{cases}$$

ELECTROPHOTOGRAPHIC COPYING MACHINE OF A MULTI-SIZE COPYING TYPE

The present invention relates to an electrophotographic copying machine of a multi-size copying type in which the image of an original to be copied formed on a copy material such as copy paper can be formed either in a size equal to the original or in a size reduced from the original. More particularly, the present invention relates to an optical system having a slit width adjusting mechanism incorporated in the copying machine for adjusting the width of the slit in relation to the type of copying operation whether it is an equal size copying operation or a reduced size copying operation.

Commonly, in an electrophotographic copying apparatus, especially a compact size slit exposure type, a ribbon shaped light image of an original placed on a transparent platform and illuminated by light source is projected onto a rotating photoreceptor drum having therearound a photoconductive or photoreceptor surface or light receiving surface on a conductive backing, through a slit disposed adjacent to the photoreceptor surface, via an optical system having a lens and mirror assembly which is provided between the platform and the photoreceptor drum, while either the transparent platform or the optical system is adapted to reciprocate in timed relation to the rotation of the photoreceptor drum for scanning the original on the platform, whereby an electrostatic latent image of the original is formed on the preliminarily charged photoreceptor surface in a known manner. In such a conventional slit exposure, the pattern of the original in the form of a light beam is sequentially projected onto the photoreceptor surface of the rotating drum through a slit having a rectangular shape which extends across the width of the drum.

However, due to the curvature of the photoreceptor, i.e., the drum surface, there is a disadvantage in the use of such a rectangular slit that the image projected through the slit onto the photoreceptor surface becomes indefinite or out of focus due to a reduction of resolving power as described hereinbelow with reference to FIG. 1.

In FIG. 1, there is shown schematically an original document D the image of which is to be focussed onto a photoreceptor drum E having a small diameter by an optical lens means F. The image of a point G near the edge of the original document D is projected by the lens means F to a point exterior to the drum E, i.e., the point G cannot be recorded on the drum E. The furthest point from the center of the original document the image of which can be projected onto the surface of the drum E is point H, the image of which is formed as point H' on the drum E by light which is more or less tangential to the drum periphery. In any drum such as drum E, the point H' which is the projection of the point H is indefinite in its shape extending to a certain extent along the surface of the drum E and occupying a larger area than that occupied by the flat point H on the original ducument. The main increase of the area of the point H' is in an arcuate path extending along a line followed by the periphery of the drum, and subsequent transfer of the image of the point H' onto a sheet of copy paper results in a distorted image. It is convenient to express the amount of distortion $\Delta a$ in terms of the extension or elongation of the point H' with respect to the point H. To avoid projection onto the drum E of light beams which are almost tangential thereto, it is known to provide between the original document D and the drum E an opaque board I having defined therein a slit I$a$ which permits passage therethrough and projection onto the drum E of only a narrow band of image defining light coming from the original document, whereby the area of the drum E exposed is comparatively flat, successive portions of the document D being moved past the slit Ia while the drum E is rotated at a corresponding speed. In this case, designating the slit width as S and the radius of the drum E as $r$, the maximum distortion $\Delta a$ which can occur, i.e., the distortion of images produced by light passing through the slit Ia immediately adjacent to the edge thereof is:

$$(S/2)^2 = r^2 - (r - \Delta a)^2$$

or, $$(S/2)^2 = \Delta a(2r - \Delta a)$$

From this, since $r$ is normally much greater than $\Delta a$, an approximation can be obtained as follows:

$$\Delta a = [(S/2)^2/2r]$$

In other words, distortion becomes greater as the width of the slit is made greater or as the radius of the drum E is made smaller. The distortion also becomes greater as the aperture of the lens means becomes greater, and it is therefore possible to reduce the diameter of the drum E and still maintain a given quality of picture by employing a lens with less light-gathering ability or making the slit Ia narrower. In this case, however, in order to ensure efficient exposure of the drum E it is necessary either to increase the amount of illumination, which requires a larger illumination means occupying more space, or to move the original document D and drum E more slowly, which results in a longer time being required to obtain copies.

Decreasing the diameter and thus increasing the curvature of the drum surface also results in undesirable effects in the direction of the width of a copy, as may be appreciated from FIG. 2, which shows the trace of document image points J, K, L, M, N which have been projected through the slit I$a$ onto the drum E. Along the tangential line contacting the image-formation plate and the drum E, the points J, K, L, M, and N are correctly positioned in correspondence to the respective points on the original document, but in other locations there is distortion $\Delta b$ which increases with an increase of the distance from the center of the image towards the opposite sides thereof and is determined by the radius of the drum, the length of the slit and the angle of view of the lens means.

In order to overcome this drawback, it is known to those skilled in the art to employ a board in which the slit is wider at the center than at the opposite ends thereof.

An optical lens means also presents problems with respect to the amount of transmitted light and hence efficiency and evenness of illumination of the drum E. One of the reason for this problem is due to the cosine law of the optical characteristics of a lens where the amount of light transmitted onto the drum E through the lens is greater at the center thereof, as indicated by the curves $P_1$ and $P_2$ in FIG. 3(a), in which the abscissa and the ordinate represent the distance measured from the center of the image and the rate of light transmitted in contrast with the amount of transmitted light at the center of the image, respectively. The lens used for obtaining the relation shown in FIG. 3(*a*) had a focal length of 245 mm, and the curves $P_1$ and $P_2$ represent the characterstic for an equal size copying operation where half the width of the projected image is 150 mm and a reduced size (0.707 times the size of the original) copying operation where the half the width of the projected image is 106 mm, respectively.

In order to eliminate the unevenness of the illumination of the drum E, while at the same time, to improve the distortion of the image at the opposite ends of the slit, it is concluded that the illumination device should be brighter towards the opposite ends for compensating for the unevenness of the illumination while employing a board in which the slit is wider at the center than at the opposite ends thereof.

Referring to FIG. 3(*b*), there is shown a relation between the brightness of the illumination device at the center portion thereof where it is defined as having a brightness of unity and the brightness of the illumination device at a point near one end in contrast to the brightness at the center.

However, in an electrophotographic copying machine for carrying out various sizes of copying operations where the illumination device and the form of the slit are particularly designed to produce an even distribution of the amount of exposure for one particular size copying operation such as an equal size copying operation, in the other size copying operation, for example, a contracted size operation, the amount of illumination and the distribution of the illumination projected on the drum vary respectively so as to cause an increase and unevennesses thereon. Particularly, the distribution of the illumination is varied in such a manner as to increase the amount of illumination towards the peripheral edges of the projected image. As a result, the amount of exposure projected on the drum is increased and the distribution of the amount of exposure becomes uneven particularly toward the peripheral edge of the copy.

Although there have been proposed means for correcting the change of the amount of exposure with respect to the change of the size of copying operation in, for example, U.S. Pat. Ser. No. 3,883,244, or in Japanese Utility Model publication Ser. No. 14068/1961 or Japanese Utility Model Publication laid open to public Ser. No. 18539/1974, there have been proposed no means for correcting the distribution of the amount of exposure for different size copying operations.

Accordingly, it is a main object of the present invention to provide an improved type of electrophotographic copying machine for carrying out various size copying operations in which the copied image obtained during one size copying operation such as a reduced size copying operation has as good quality of the image as those obtained during the other size copying operation such as an equal size copying operation without changing the brightness of the illumination device for the respective copying operations.

It is another object of the present invention to provide an electrophotographic copying machine of the above described type in which the distribution of the amount of exposure is maintained evenly over the entire surface of the drum, regardless of any change of the size of the copying operation.

It is still another object of the present invention to provide an electrophotographic copying machine of the above described type which is compact in size and can be produced at a low manufacturing cost.

In order to obtain a good image quality on the copy paper in a reduced size copying operation as well as in an equal size copying operation, the inventors of the present invention have found that it is necessary to change the form of the slit when there is a change of the size of the copying operation.

Referring to FIG. 3(c), there is shown one example of the sizes of a slit $R_1$ for an equal size copying operation and also one example of the sizes of a slit $R_2$ for a reduced size copying operation. As is apparent from FIG. 3(c), the slit $R_1$, only half of which is shown, has a half length of 150 mm, a width at the end of 5 mm, and a width at the center of 12 mm, while the slit $R_2$ has a half length of 106 mm, a width at the end of 3.4 mm, and a width at the center of 8.7 mm.

According to a preferred embodiment of the electrophotographic copying machine of the invention, the slit mechanism comprises a fixed slit mechanism forming a large size slit which corresponds with the slit $R_1$ shown in FIG. 3(*c*) and a movable slit plate member movable, upon a change of the size of the copying operation, for partially covering the slit formed by the fixed slit mechanism for forming a small size slit which corresponds with the slit $R_2$ shown in FIG. 3(*c*).

It is to be noted that the timed relation between the scan of the transparent platform or the optical system and the rotation of the drum is such that, during the equal size copying operation, the speed of movement of the transparent platform or the optical system is equal to the speed of movement of the drum surface, while during the contracted size copying operation where the size is $n$ (in this case $n$ is equal to 0.707) times the size of original, the speed of movement of the transparent platform or the optical system is $1/n$ times the speed of movement of the drum surface.

It is also to be noted that the various steps such as the corona charging step and the exposing step are carried out in timed relation with the scan of the transparent platform or optical system, and with the transparent of the copy paper by a suitable cam member or the copy paper being moved past a certain point in which the speed of movement of the drum surface, the speed of movement of the copy paper and the speed of rotation of the cam member are maintained in a predetermined relationship regardless of the size of the copying operation while the speed of the scan of the platform or the optical system is different. Accordingly, the timed relation between the movement of the various steps and the scan of the transparent platform or the optical system during an equal size copying operation is different from the timed relation therebetween during a contracted size copying operation.

In order to accommodate such a difference, there have been provided means for adjusting the timed relation between the movement of the various steps and the scan of the platform or the optical system or for otherwise positioning the original on the platform in different places for different sizes of copying operation.

Such means are, for example a delay mechanism for delaying the time of starting of the scan of the platform or the optical system, or for delaying the time of starting of the transfer of the copy paper. In place of such means, there may be provided different switch means for each size of copying operation. In contrast to such means, the present invention includes correcting means as described hereinbelow.

In the case where the electrophotographic copying machine is a platform scanning type, the correction is carried out by a change of the initial position of the platform for starting the scan at the time of a change of the size of copying operation, without changing an position for placing the original on the platform, whereas in the case where the electrophotographic copying machine is an optical system scanning type, the correction is carried out by a change of one of optical elements such as the reflecting mirror for changing the length of the optical path between the original and the drum surface at the time of a change of copying operation.

These and other objects and features of the present invention will become apparent from the following description of preferred embodiments thereof in conjunction with the accompanying drawings, in which;

FIGS. 1 through 3(*c*) are drawings referred to in the foregoing description,

FIG. 1 being a schematic side view of exposure of a photoreceptor drum by optical lens means, FIG. 2 being a schematic drawing showing the distortion which occurs along the length of an exposure-light restriction slit employed in conventional photocopying machines, FIG. 3(*a*) being a graph showing the amount of transmitted light on the drum surface along in the longitudinal direction thereof, FIG. 3(*b*) being a graph showing the distribution of brightness of an illumination device along the longitudinal direction thereof and FIG. 3(*c*) being a schematic front view of forms of slits used for an equal size copying operation and for a reduced size copying operation;

Before the description of the present invention proceeds, it should be noted that like parts are designated by like reference numerals throughout the accompanying drawings.

Figure 4:
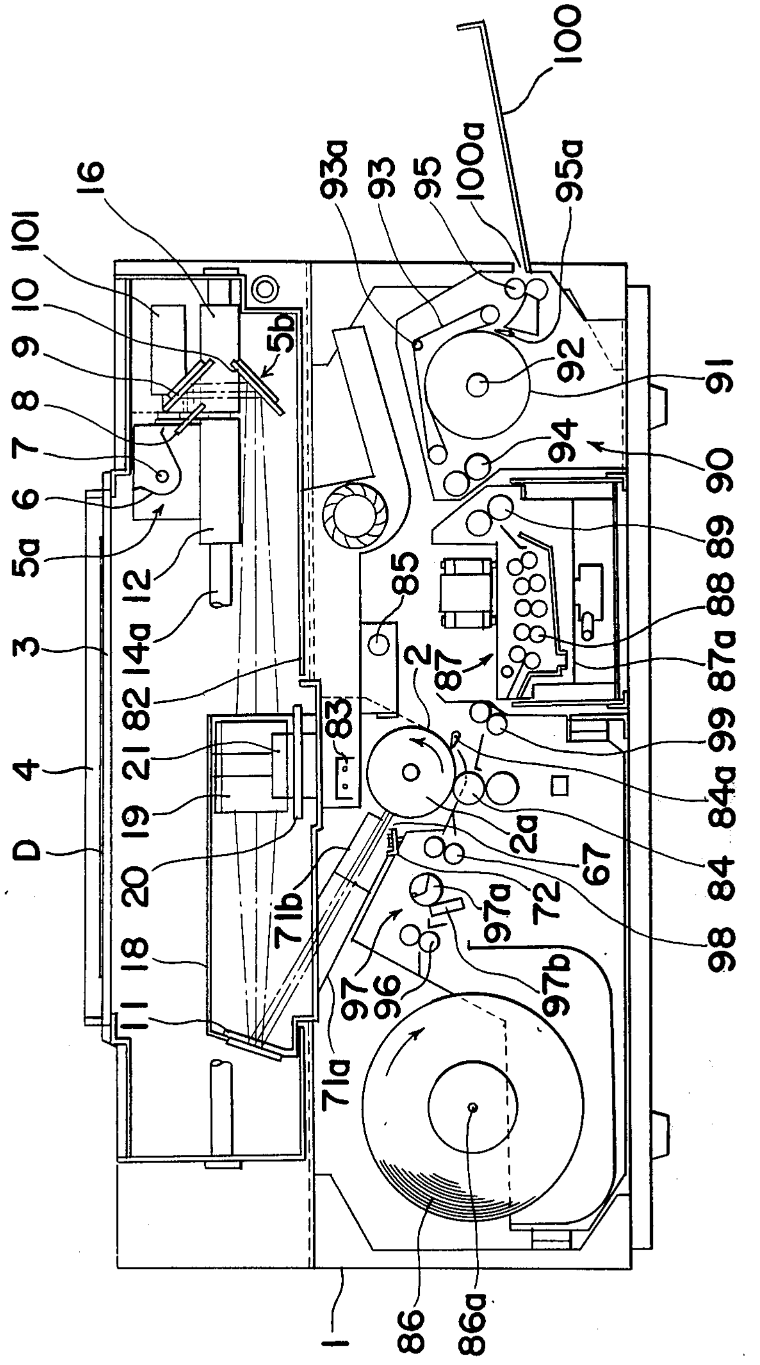
FIG. 4 is a schematic side sectional view of an electrophotographic copying machine of the present invention.

Referring to FIG. 4, there is shown an electrophotographic copying machine comprising a housing structure substantially divided into upper and lower compartments; the upper compartment accommodates therein an optical system while the lower compartment accommodates therein an electrophotographic processing system. The housing structure is generally designated by a reference numeral 1 and has a transparent support 3 stationarily mounted on the top of the housing structure 1, and a cover member 4 pivotally provided at the edge of the support 3, which transparent support 3 is made of, for example, a transparent glass plate, and is adapted to support the original or document D to be copied thereon and the cover member 4 is adapted to press down the original D against the support 3. The optical system will be described in detail later, whereas the processing system will now be described.

The electrophotographic processing system and the method performed thereby are well known to those skilled in the art and, therefore, the various operating elements thereof will be described in terms of their functions.

The electrophotographic copying system comprises a photoreceptor surface, generally indicated by a reference numeral 2, including a photoconductive layer or light receiving layer on a conductive backing and formed in the shape of drum 2*a*, which is mounted on a shaft (not shown) journaled in a machine frame (not shown) so as to rotate in the direction indicated by the arrow to cause the drum surface sequentially to pass a plurality of processing stations including charging, exposure or image forming, transfer and erasing stations.

The charging station includes a corona charger 83 which applies a uniform electrostatic charge on the photoreceptor surface 2. Positioned next to and adjacent to the charging station with respect to the direction of rotation of the photoreceptor surface 2 is the exposure or imaging station at which rays of light carrying an image of the original D to be copied, which have been transmitted from the transparent support 3 by the optical system, as will be described later, through an exposure slit 67 formed by a slit mechanism 72, in the form of a ribbon of light, are projected onto the photoreceptor surface 2 to dissipate the electrostatic charge in the exposed area thereof thereby forming a latent electrostatic image of the original to be copied.

On the left-hand side of the drum 2*a*, there is provided a paper feeding station including a paper feeding mechanism adapted to feed sheets of recording medium, for example, copy paper, successively to the transfer station in coordination with the presentation of the latent image at said exposure station. This paper feeding mechanism comprises a paper supply roll 86 which is mounted on a shaft 86a journaled in a machine frame (not shown) so as to rotate in the direction indicated by the arrow to cause the copy paper to be unloaded from the roll 86. The paper feeding mechanism further comprises a pair of juxtaposed take-up rolls 96 positioned adjacent to the roll 86 and adapted to take-up the leading edge of the copy paper during unloading from the roll 86 and a pair of juxtaposed conveyor rolls 98 positioned between the take-up rolls 96 and the transfer station and adapted to convey the copy paper towards the transfer station. Provided between the takeup roll 96 and the conveyor roll 98 is a cutter 97 for cutting the copy paper thereat when a predetermined length of the copy paper has passed through the cutter 97. The cutter 97 includes a rotatory blade member 97*a* and a stationary blade member 97*b* which are normally separated from each other. When cutting the copy paper, the rotatory blade member 97*a* is turned towards the stationary blade member 97*b*. It should be noted that other types of cutters which are known can be provided instead of the above described type.

At the transfer station, there is provided a transfer roll 84 having the curved surface thereof pressed against the photoreceptor surface 2 for effecting transfer of the electrostatic latent image on the photoreceptor surface onto the sheet of copy paper when the sheet of copy paper is fed between the photoreceptor surface 2 and the transfer rolls 84.

The sheet of copy paper, that has had the electrostatic latent image transferred thereon to the photoreceptor surface 2 at the transfer station, is thereafter removed from the photoreceptor surface 2 by a peeling mechanism 84*a* and forwarded by a pair of juxtaposed forwarding rolls 99 towards developing device 87 of the wet developing type, mainly comprising a developing tank 87*a* containing developing solution of toner in a liquid state and five pairs of juxtaposed electrode rolls 88 provided in the developing tank 87*a*, wherein the latent image on the copy paper sheet is developed into a visible image. Positioned adjacent to the exit of the tank 87*a* is a pair of juxtaposed squeezing rolls 89, provided to squeeze the developing solution from the copy paper sheet which has passed through the electrode rolls 88.

The copy paper sheet coming out of the developing device 87 is fed into a fixing or fusing device 90, comprising a fusing drum 91 having a fusing heater 92 in the central portion thereof for heating a surface of the fusing drum 91, a fusing belt 93 movably supported by supporting rolls 93*a* and a pair of absorbent rollers, one portion of the belt 93 extending along the surface of the fusing drum 91. The wet copy paper sheet is inserted between the surface of the fusing drum 91 and the fusing belt 93 for being dried and for fixing the visible image thereon, after which the copy paper sheet is peeled off the surface of the fusing drum 91 by a separation claw 95*a* provided adjacent the fusing drum 91 with its edge contacting the fusing drum surface, and the sheet of copy paper is then ejected from the copying machine into a copy tray 100 through juxtaposed discharging rolls 95 provided between the separation claw 95*a* and the copy tray 100, and through a discharging opening 100*a*.

The photoreceptor surface 2, from which the transferred sheet has been separated at the peeling station, is subsequently transported during continued rotation thereof to the erasing station. The erasing station includes an erasing lamp 85 which erases the residual charge on the photoreceptor surface 2 in readiness for a subsequent cycle of the copying operation. For this purpose, the erasing station is generally located prior to the charging station which has already been described.

Figure 5:
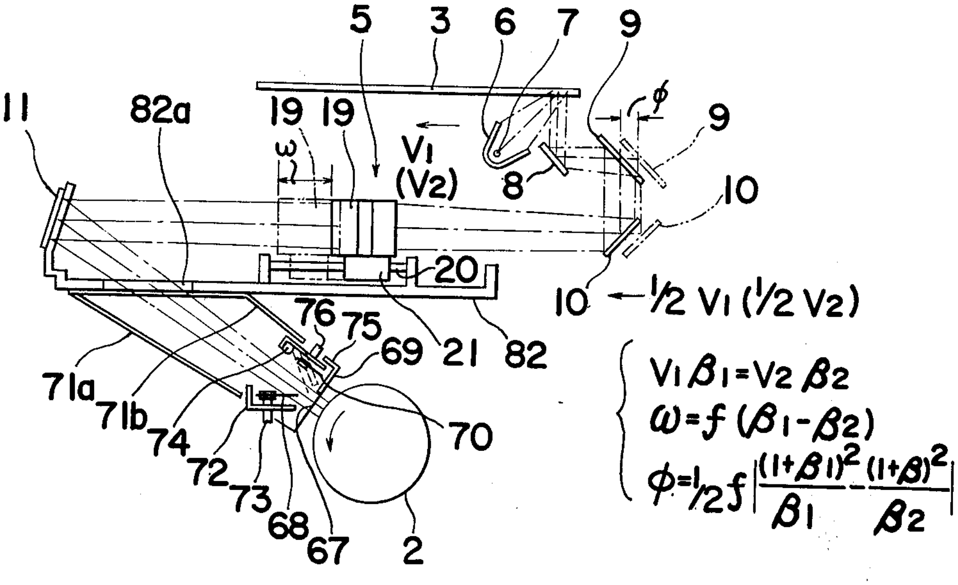
FIG. 5 is a fragmentary sectional view of the optical system of the electrophotographic copying machine shown in FIG. 4.
Figure 6:
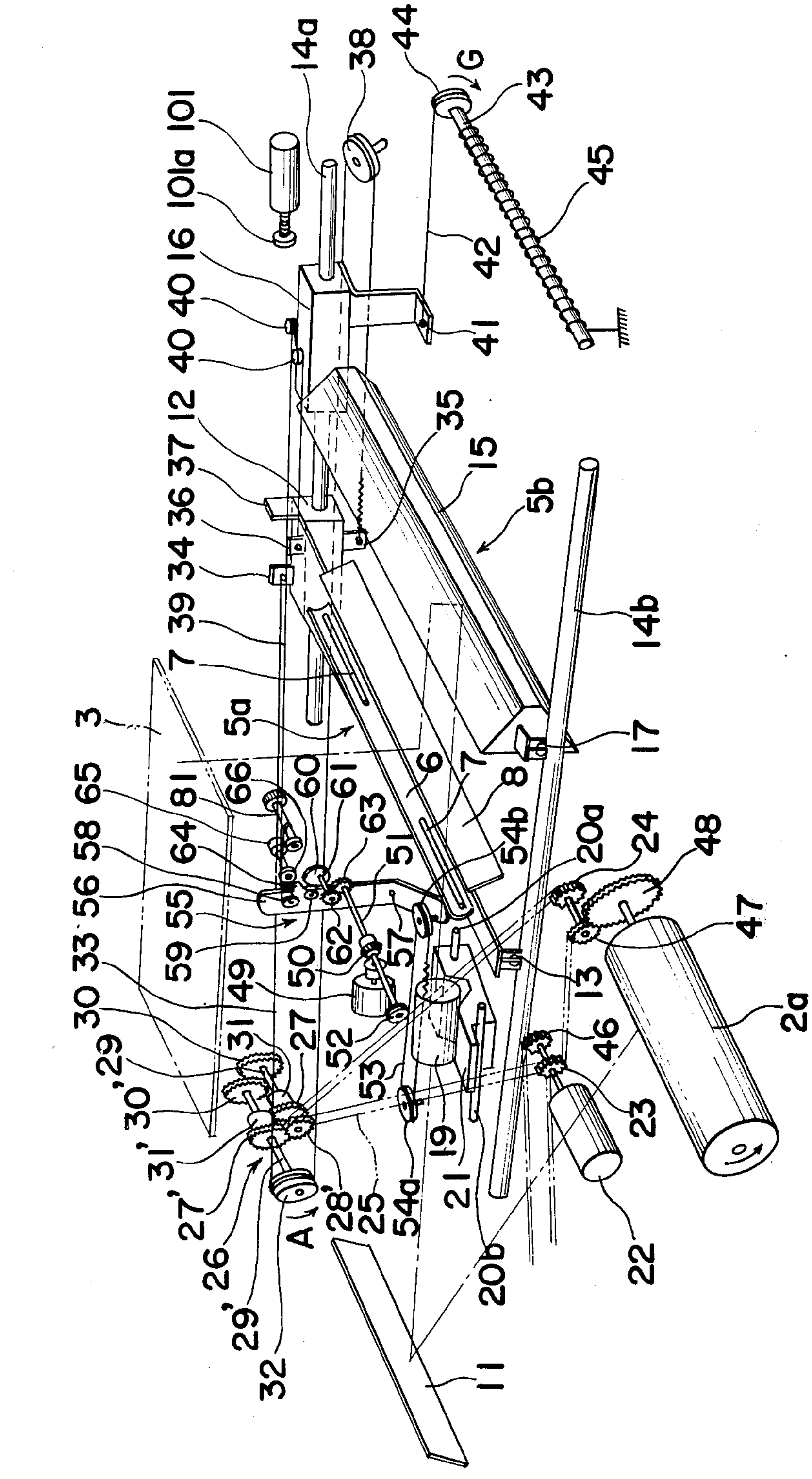
FIG. 6 is an exploded perspective view of the optical system of the electrophotographic copying machine shown in FIG. 4.

Referring also to FIGS. 5 and 6, the optical system of the electrophotographic copying machine, which is substantially accommodated within the upper compartment of the machine housing 1, comprises an illumination device of any known construction, generally indicated by 5*a*, which illumination device 5*a* includes a source of light or lamp 7, a reflector 6 and a reflective mirror arrangement 8 designed such that rays of light emitted from the light source 7 can be projected towards the original D on the transparent support 3 in the shape of a ribbon of light to sequentially illuminate said original D over the entire width thereof. This illumination device 5a as shown in FIG. 6 is rigidly mounted on a carriage 12 and is reciprocally movably carried by the carriage 12 and a rotatable roll 13 on at least one pair of spaced guide rails 14*a* and 14*b* which are supported in a position within the machine housing 1 and which extend in substantially parallel relation to the plane of the transparent support 3.

Reciprocally movably mounted on the same guide rails 14*a* and 14*b* by a rotatable roll 17 is a mirror carriage 16 having reflective mirrors 9 and 10 (FIG. 5) rigidly mounted thereon for reflecting the ribbon of light from the original D on the transparent support towards a fixed reflective mirror 11 through a lens assembly 19. The reflective mirror 11 and the lens assembly 19 are incorporated in a casing 18 (FIG. 4) which is fixedly provided in the upper compartment and approximately above the drum 2*a*. The reflective mirror 11 is fixedly provided in the casing 18 at the left-hand end in a predetermined position to reflect and project the ribbon of light onto the photoreceptor surface 2 at a predetermined angle of incidence to form the latent image of the original, as the drum rotates in relation to the movement of the illumination devices 5*a* and 5*b*. On the other hand, the lens assembly 19 (FIG. 6) is rigidly mounted on a lens carriage 21 reciprocally movably mounted on a pair of spaced second guide rails 20*a* and 20*b* which are supported in a position within the casing 18 and which extend in substantially parallel relation to the previously mentioned guide rails 14*a* and 14*b*, in other words parallel to the optical axis.

The above described illumination devices 5a and 5b are connected to the driving means to reciprocally move along the guide rails 14*a* and 14*b* between their initial position and their scanned position. The driving means comprises a driving motor 22 having a driving gear 23 fixedly mounted on the shaft on the motor 22 and transmission gears 26 which are connected to each other by a timing belt or an endless chain 25 passing therearound. The chain further extends around a gear 24 which is connected to the drum 2a through gears 47 and 48 to rotate the drum 2a during the movement of the chain 25. In addition to the gear 23, the motor 22 has a gear 46 connected to the shaft thereof for providing a driving force to the various rolls provided in the lower compartment such as the take-up roll 96, conveyor rolls 98, forwarding rolls 99, etc.

The transmission gears 26 include a first gear array and a second gear array in which the first gear array has a main gear 28' having the chain 25 passing therearound and a clutch gear 27 fixedly connected to the main gear 28' through a shaft (not visible in FIG. 6). The first gear array further includes a gear 30 fixedly mounted on a shaft 29 and a first clutch member 31 provided between the shaft 29 and the clutch gear 27. When the clutch member 31 is brought to an engaged-state or on-state, the driving force of the gear 28' is transmitted therethrough to rotate the gear 30 during the movement of the chain 25, while on the other hand, when the clutch member 31 is in a disengaged-state or off-state, the driving force of the gear 28' is only transmitted to the gear 27 and the gear 30 is free from the driving force of the gear 28'.

The second gear array provided adjacent to the first gear array includes a gear 30' fixedly mounted on a shaft 29' and being engaged with the gear 30, a clutch gear 27' rotatably mounted on the shaft 29' and being engaged with the clutch gear 27 and a second clutch member 31' provided between the gear 30' and the clutch gear 27'. The second gear array has a reel 32 fixedly mounted on the shaft 29'. When the clutch member 31' is in the engaged-state or on-state, the clutch gear 27' engages with the gear 30' by a suitable pin projection (not shown) provided on the clutch member 31' to rotate the clutch gear 27' together with the gear 30', and thus substantially with the shaft 29'. On the other hand, when the clutch member 31' is brought to a disengaged-state or off-state, the clutch gear 27' is disengaged from the gear 30' and the clutch gear 27' is free from the rotation of the gear 30'.

The transmission gears 26 arranged as described above transmit the driving force of the gear 28' to the reel 32 to rotate it at two different speeds. The first speed which is a slow speed is obtained when the clutch members 31 and 31' are in the on-state and the off-state, respectively, for transmitting the driving force of the gear 28' through the clutch gear 27, clutch member 31, gear 30, gear 30' and to the reel 32. This slow speed movement is effected when it is necessary to perform an equal size copying operation. On the other hand, the second speed which is of a fast speed is obtained when the clutch members 31 and 31' are in the off-state and on-state, respectively, for transmitting the driving force of the gear 28' through the clutch gear 27, clutch gear 27', clutch member 31', gear 30' and to the reel 32. This fast speed movement is effected when it is necessary to perform a reduced size copying operation.

It is to be noted that each of the clutch members 31 and 31' has a delay mechanism incorporated therein for delaying the transmission of the driving force therethrough for a predetermined time. Such a delay mechanism is provided for preventing the illumination devices 5*a* and 5*b* from scanning for a predetermined time which is sufficiently long for permitting the light source 7 to be fully lighted.

In order to move the above described carriage 12 and mirror carriage 16 between their initial position and the scanned position, there are provided three different cables.

A first cable 33 having its opposed ends connected to the carriage 12 at projections 34 and 35 runs around the reel 32 and then around a pulley 38 provided on the housing 1, so that rotation of the reel 32 in the direction indicated by the arrow A will result in a movement of the carriage 12 in a direction toward the left as viewed in FIG. 6. Such direction corresponds with the direction of the scanning of the illumination device 5a mounted on the carriage 12.

A second cable 39 has one end connected to the carriage 12 at projection 36 and the other end connected to an adjustment projection 81, and the intermediate portion extends around a pair of pulleys 40 provided on the carriage 16 and then around a roller 58 provided on an arm member 56, which will be described later, so that the movement of the carriage 12 in the scanning direction pulls the second cable 39 therewith to cause the carriage 16 to move together with the carriage 12 in the same direction.

As will be apparent to those skilled in the art, when the carriage 12 carrying the illumination device 5*a* is moved from the initial position to the scanned position while the ribbon of light from the illumination device 5a scans the original D on the transparent support 3, the mirror carriage 16 carrying the reflective mirrors 10 and 11 thereon moves in pursuit of the carriage 12 at half the velocity of movement of the carriage 12.

A third cable 42 has one end connected to the mirror carriage 16 at arm 41 and the other end wound up on a reel 44 fixedly mounted on a shaft 43 which is rotatably supported in the housing 1. The shaft 43 has a coil spring 45 there around for urging the shaft 43 and also the reel 44 to rotate in the direction as indicated by the arrow G.

After having moved the carriage 12 together with the mirror carriage 16 in the scanning direction for a predetermined distance determined by the number of rotations of the reel 32, the reel 32 is disconnected from the driving force, when both clutch members 31 and 31' are changed to the off-state, and the carriages 12 and 16 are returned to their initial positions by the effect of the spring force exented on the mirror carriage 16 by the third cable 42. The initial position of the carriage 12 is determined by contact between an upright plate 37 provided on the carriage 12 and a contact member 101 provided on the housing 1. The precise adjustment of the initial position of the carriage 12 is carried out by adjusting the position of a screw member 101*a* provided on the front of the contact member 101. On the other hand, the initial position of the mirror carriage 16 is determined by the length of the second cable 39 extending between the carriage 12 and the adjustment projection 81. The precise adjustment of the initial position of the carriage 16 is carried out by a winding up or paying out of the second cable 39 by rotation of the adjustment projection 81.

In addition to such precise adjustment, the carriage 16 can be selectively adjusted to change its initial position between an advanced initial position or a retracted initial position. The advanced initial position is when the carriage 16 is positioned closer to the carriage 12 and the retracted initial position is when the carriage 16 is positioned away from the carriage 12. These advanced or retracted initial positions of the carriage 16 are controlled by an adjustment device 55 which is provided in the upper compartment and in a space adjacent to the casing 18.

Figure 7:
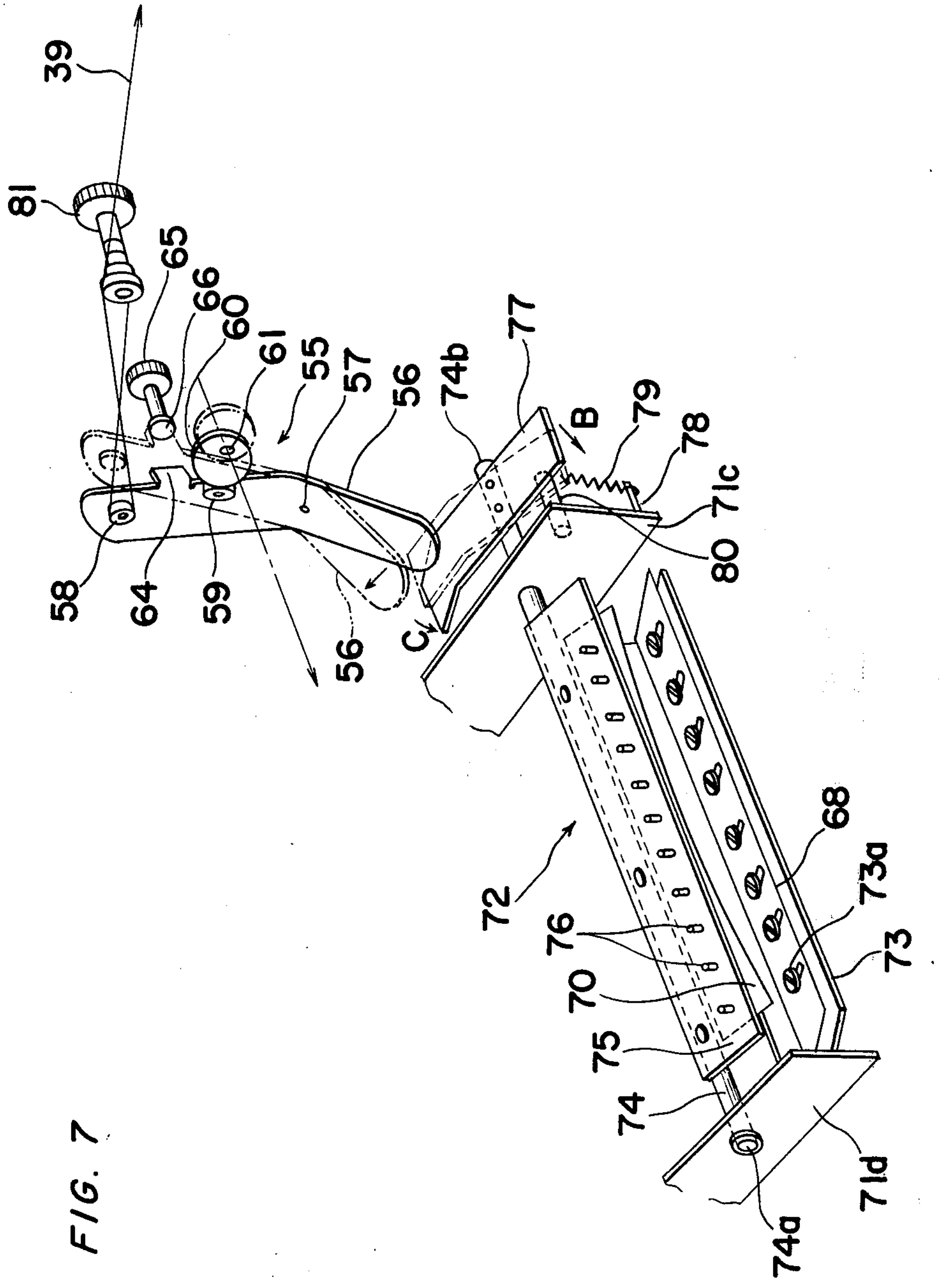
FIG. 7 is an exploded perspective view of the slit mechanism of the electrophotographic copying machine shown in FIG. 4.

Referring to FIG. 7, the adjustment device 55 comprises the adjustment arm member 56 having an intermediate portion which at approximately the central portion thereof is supported by a pin projection 57 provided on the housing 1 for permitting the arm member 56 to move pivotally thereabout. The arm member 56 has a roller 58 provided at the top end portion thereof around which the second cable 39 runs and has a contacting face 64 therein below the roller 58. The contacting face 64 is provided for contacting an eccentric cam member 66 provided on a knob member 65 which is fixedly provided on the housing 1 for restricting the arm member 56 from further rotation about the pin projection 57 in the a clockwise direction. It is to be noted that the eccentric cam member 66 can be rotated to change its position so as to change the degree of restriction of the pivotal movement of the arm member 56. Provided below the contacting face 64 is a roller 59 which slidingly engages with a cam plate 60. The cam plate 60 is connected to a lens positioning motor described later for turning the cam plate 60 to cause the arm member 56 to move between a first position and a second position. The first position is that in which the are member 56 is rotated the farthest in the counterclockwise direction as shown by full lines in FIG. 7 and is obtained by an engagement of the cam plate 60 with the roller 59. On the other hand, the second position is that in which the arm member 56 is rotated the farthest in the clockwise direction as shown by the chain lines in FIG. 7, and is obtained by the engagement of the cam member 66 with the contacting face 64. When the arm member 56 is in the second position, the cam plate 60 is disengaged from the roller 59. These first and second positions of the arm member 56 control the positioning of the carriage 16 in the advanced and retracted initial positions, respectively.

Figure 8:
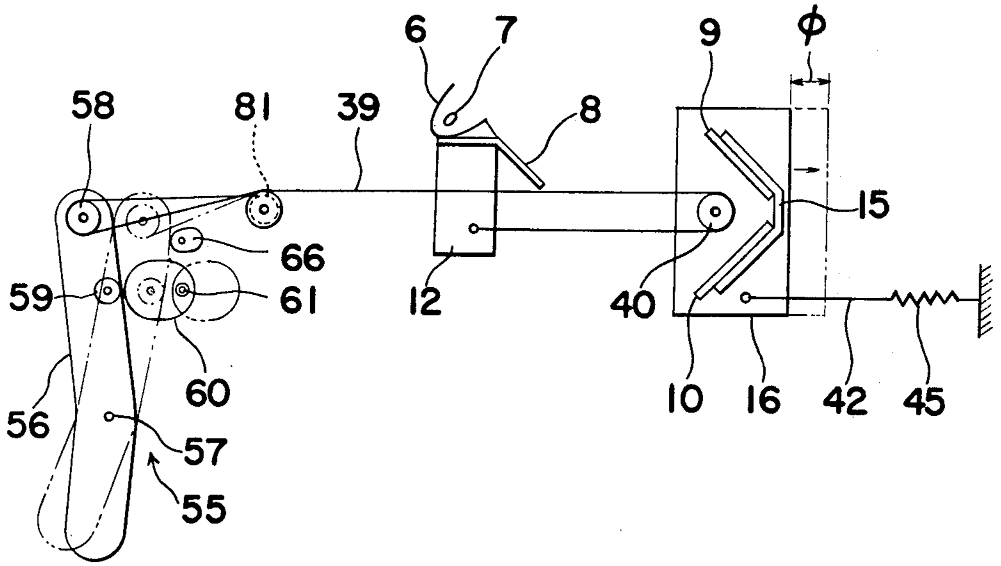
FIG. 8 is a schematic front view of the initial position setting mechanism for the optical system of the electrophotographic copying machine shown in FIG. 4.

Referring particularly to FIG. 8, there is shown the relation between the arm member 56 and the carriage 16, in which when the arm member 56 is in the first position as shown by full lines the carriage 16 is caused to come close to the carriage 12, while on the other hand, when the arm member 56 is in the second position as shown by the chain lines, the carriage is caused to move away from the carriage 12. In other words, when the arm member 56 is in the first position it causes the distance between the carriages 12 and 16 to be shorter than the distance when the arm member 56 is positioned in the second position.

Referring again to FIG. 7, the lower end of the arm member 56 moves back and forth to act on the slit mechanism 72 provided below the arm member 56. The slit mechanism 72 comprises frame members 71*c* and 71*d* defining a passage therebetween in the width direction of the ribbon of light, a shaft 74 extending between the frame members 71*c* and 71*d* at a position adjacent to the upper edge thereof and in a perpendicular relation to the passage, a main plate 75 having a rectangular shape and fixedly connected to the shaft 74 in the longitudinal direction and extending across the passage and a sub-plate 70 partially overlapping the main plate 75 and being fixedly connected to the main plate 75 by a plurality of adjusting bolts 76 so as to extend along the main plate 75. The sub-plate 70 projects slightly from the main plate 75 and the edge of the projecting portion is curved inwardly. The amount of projection can be adjusted by the rearrangement of the sub-plate 70 by loosening of the bolts 76. One end 74*a* of the shaft 74 is rotatably mounted on the frame member 71*d*, while the other end 74*b* extends through the frame member 71*c* and extends outwardly from the frame member 71*c* and a plate member 77 is mounted on the shaft 74 closely adjacent to the end 74*b*.

A coil spring 79 is provided between one end of the plate member 77 and a hook projection 78 on the frame member 71*c* for urging the plate member 77 to rotate in the direction indicated by the arrow B. The rotation of the plate member 77 in the direction of the arrow B is restricted by a pin projection 80 which is mounted on the frame member 71*c*. The other end of the plate member 77 is slightly bent downwardly for facilitating the engagement therewith of the lower end of the arm member 56 which presses the plate member 77 down in the direction indicated by the arrow C against the spring force when the arm member 56 is pivoted to its first position as shown in full lines.

Referring also to FIG. 5, the slit mechanism 72 further includes frame members 71*a* and 71*b* defining a passage in the thickness direction of the ribbon of light, a slit plate 68 fixedly by bolts 73*a* on a plate supporting member 73 which is fixed on the frame member 71*a* and a frame member 69 extending from the frame member 71*b*. The height of the slit plate 68 can be adjusted by turning the bolts 73*a* to form the slit plate 68 in a waveform, thereby adjusting the width of the ribbon of light on the drum surface.

The establishment of the slit 67 is described hereinbelow with respect to the movement of the arm member 56.

Figure 1:
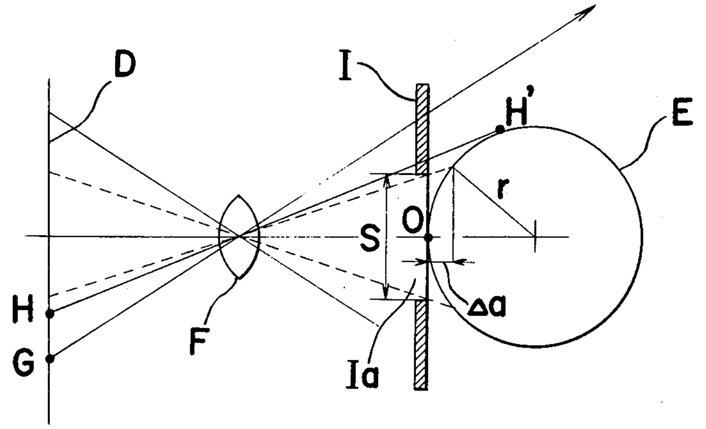
Figure 2:
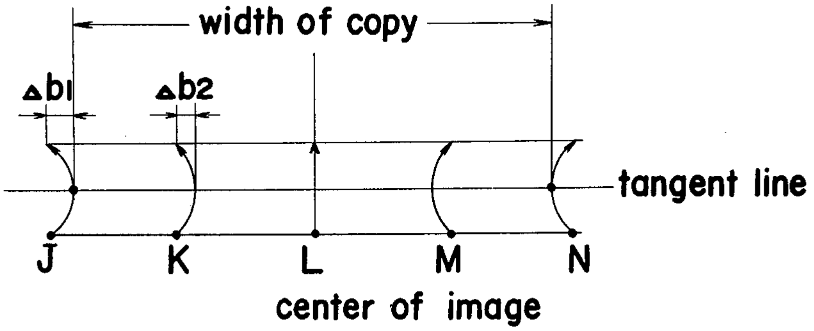
Figure 3A:
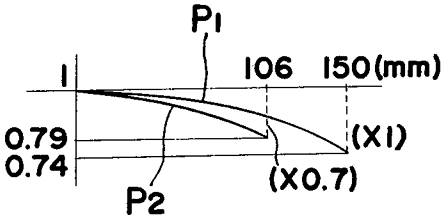
Figure 3B:
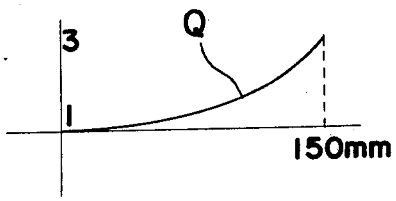
Figure 3C:
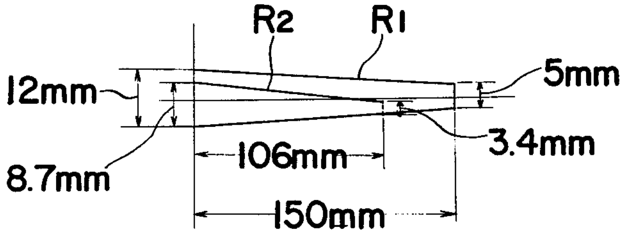

When the arm member 56 (FIG. 7) is moved to its first position, the lower end thereof presses the plate member 77 down to rotate it in the direction C, so as to rotate the shaft 74 altogether with the main and sub-plates 75 and 70 and to open the passage for the ribbon of light wide. In this wide opened position, which is for the equal size copying operation, the slit 67 has a shape like that of slit $R_1$ as shown in FIG. 3(c) defined between the slit plate 68 and the frame member 69 (FIG. 5). On the other hand, when the arm member 56 is moved to its second position, the lower end thereof slides off the plate member 77 to allow the plate member 77 to rotate in the direction B, so as to rotate the shaft 74 together with the main and sub-plates 75 and 70 and to arrow the passage for the ribbon of light. In this narrow position, which is for the reduced size copying operation, the slit 67 has a shape like that of slit $R_2$ as shown in FIG. 3(*c*) defined between the slit plate 68 and the sub-plate 70.

The edge of the sub-plate 70 is curved concavely, so that the width of the slit 67 formed between the slit plate 68 and the sub-plate 70 is reduced toward the opposite ends than as compared with the slit formed between the slit plate 68 and the frame member 69. Accordingly, the decrease in the amount of exposure at the opposite ends of the slit 67 is large in comparison with the center of the slit 67 when the slit 67 is formed between the slit plate 68 and the sub-plate 70. Therefore, the distribution of the amount of exposure in the longitudinal direction of the slit 67 is maintained at a uniform amount regardless of the type of copying operation, i.e. whether it is an equal size copying operation or reduced size copying operation.

Referring back to FIG. 6, the cam plate 60 causing the arm member 56 to perform the pivotal movement as described above is controlled by the lens positioning motor 49 connected to a shaft 51 through a pair of bevel gears 50. One end of the shaft 51 is connected to approximately the center of the cam plate 60 through suitable transmission gears 62 and 63, while the other end of the shaft 51 is connected to a reel 52.

A fourth cable 53 having its opposite ends connected to the lens carriage 21 has approximately center portion of the cable 53 wound on the reel 52 while one section of the cable 53 between the reel 52 and the lens carriage 21 runs around a pulley 54*a* and the other section runs around a pulley 54*b*. The pulleys 54*a* and 54*b* are spaced from each other a predetermined distance in a direction parallel to the axis of the light passing through the lens assembly 19, so the cable 53 moves the lens carriage 21 together with the lens assembly 19 along the guide rails 20 between two pulleys 54*a* and 54*b*, upon rotation of the reel 52.

The electrophotographic copying machine constructed as described above operates in the following manner for carrying out the two types of copying operations, the first type being the equal size copying operation and the second type being the reduced size copying operation, available for the machine. Each copying operation is described hereinbelow.

When it is desired to carry out the equal size copying operation, various members such as the clutch members 31 and 31', the lens assembly 19, the mirror carriage 16 and the slit mechanism 72 are respectively moved to the positions necessary to start the equal size copying operation, upon manipulation of a selection switch (not shown) provided on a switching panel (not shown). The starting position for the each member is described hereinbelow. When the selection switch is turned to the position designating the equal size copying operation, the clutch members 31 and 31' are brought to the on-state and the off-state, respectively, the lens assembly 19 is moved towards the mirror 10, as shown by the full lines in FIG. 5, the carriage 16 is moved to the advanced initial position for setting the mirrors 9 and 10 in the positions shown by the full lines in FIG. 5, and the slit mechanism 72 has the main and sub-plates 75 and 70 rotated upwardly to form the wide slit by the movement of the arm member 56 to rotate the plate member 77 in the direction indicated by the arrow C.

Thereafter, a printing switch (not shown) provided on the panel is turned on for starting the main motor 22 to drive the photoreceptor drum 2 as the well as other rolls such as the take-up rolls 96, conveyor rolls 98, forwarding rolls 99, etc., and also for turning on the light source 7. Simultaneously, the chain 25 starts to run the gear 28'. Then, after a predetermined time set in the clutch member 31, the rotation of the gear 28' is transmitted through the clutch member 31 and also through the pair of gears 30 and 30' to the shaft 29' for driving the reel 32 to rotate in the direction indicated by the arrow A. Accordingly, the carriage 12 is moved from the initial position towards the scanned position, upon movement of the first cable 33, a a velocity of $V_1$, while the mirror carriage 16 is moved from the advanced initial position towards the scanned position at half the velocity $V_1$ of movement of the carriage 12, while the carriage 12 pulls the second cable 39 therewith, for sequentially projecting a ribbon of light reflected from the original D onto the photoreceptor drum surface 2 through the optical path described hereinbelow. The light beam emitted from the light source 7 is first projected on the original D for forming the ribbon of light for image information, and then, the ribbon of light is sequentially reflected from the mirrors 8, 9, and 10 and is passed through the lens assembly 19, and further reflected from the mirror 11 for projecting the image onto the photoreceptor drum surface 2 through the wide open slit which is formed between the slit plate 68 and the frame member 69. Accordingly, a latent image corresponding to the image on the original is formed on the drum surface 2.

After having completed the projection of the light image of the original onto the photoreceptor drum surface 2, that is, after the carriage 12 and the mirror carriage 16 have moved to their scanned positions, a suitable switch (not shown) provided adjacent to the carriage 12 or to the mirror carriage 16 is operated to turn off the light source 7, and also to change the clutch member 31 to the off-state for disconnecting the reel 32 from driving force. Accordingly, the mirror carriage 16 is returned to its advanced initial position by the pulling force of the third cable 42 wound on the reel 44 moved by the force of the coil spring 45 provided on the shaft 43. With the movement of the mirror carriage 16 towards the advanced initial position, the carriage 12 is also returned to its initial position by the pulling force transmitted through the second cable 39. Thereafter, the driving motor 22 is continually rotated to rotate the drum 2 and the various rolls such as the take-up roll 96, conveyor rolls 98, forwarding rolls 99, etc., for transmitting the copy paper towards the transfer station where the latent image on the drum surface is transferred onto the copy paper and further towards the developing device 87 and through the fusing device 90 towards the copy tray 100 where the completed copy paper is deposited. Since the present invention is directed to the optical system, further explanation of the development of the image on the copy paper is omitted for brevity.

When it is desired to carry out the reduced size copying operation, the various members such as the clutch members 31 and 31', the lens assembly 19, the mirror carriage 16 and the slit mechanism 72 are respectively moved to the positions necessary to start the reduced size copying operation by manipulation of the selection switch (not shown) provided on the switching panel. When the selection switch is turned to the position designating the reduced size copying operation, the clutch members 31 and 31' are changed to the off-state and the on-state, respectively, the lens assembly 19 is moved towards the mirror 11, as shown by the chain lines in FIG. 5 by the rotation of the lens motor 49, and the slit mechanism 72 has the main and sub-plates 75 and 70 rotated downwardly to form the narrow slit. The amount of movement $\omega$ of the lens assembly 19 is determined by the diameter of the reel 52 and can be given by the following equation;

$$\omega = f(\beta_1 - \beta_2)$$

wherein $f$ is the focal length of the lens assembly, $\beta_1$ is the magnitude of enlargement of the copy size in the first size copying operation which in this case is an equal size copying operation, and $\beta_2$ is the magnitude of enlargement of the copy size in the second size copying operation which in this case is the reduced size copying operation.

The rotation of the lens motor 49 also causes the cam plate 60 to rotate 180° towards the second position, as shown by the chain lines in FIG. 7, for disengaging the cam plate 60 from the roller 59, and thus engaging the arm member 56 with the cam member 66. In this second position of the cam plate 60, the roller 58 is moved towards the mirror carriage 16 for positioning the mirror carriage 16 in the retracted initial position, as shown by the chain lines in FIG. 8. The amount of movement $\phi$ of the mirror carriage from the advanced initial position towards the retracted initial position is determined by the amount of movement of the reel 58 and can be given by the following equation;

$$\phi = \tfrac{1}{2} f\,[(1+\beta_1)^2/\beta_1] - [(1+\beta_2)^2/\beta_2]$$

Furthermore, the lower end of the arm member 56 moves away from the plate member 77 so that the plate member 77 is rotated in the direction indicated by the arrow B by the force of the spring 79 so as to form the narrow slit between the sub-plate 70 and the slit plate 68.

After the various members have, upon manipulation of the selection switch, been moved to the positions as described above, the printing switch (not shown) provided on the panel is turned on for starting the main motor 22 to drive the photoreceptor drum 2*a* as well as the other rolls such as the take-up rolls 96, conveyor rolls 98, forwarding rolls 99, etc., and also for turning on the light source 7, in the same manner as described before in connection with the equal size copying operation. Simultaneously, the chain 25 starts to run for rotating the gear 28'. Then, after a predetermined time set in the clutch member 31', the rotation of the gear 28' is transmitted through the gears 27 and 27' and also through the clutch member 31' to the shaft 29' for driving the reel 32 to rotate it in the direction indicated by the arrow A. Accordingly, the carriage 12 is moved from the initial position towards the scanned position, upon movement of the first cable 33, at a velocity of $V_2$, while the mirror carriage 16 is moved from the retracted initial position towards the scanned position at half the velocity $V_2$ of the movement of the carriage 12. It is to be noted that the velocity $V_1$ of the carriage 12 for the equal size copying operation is less than the velocity $V_2$ of the carriage 12 for the reduced size copying operation. The relation between the velocity $V_1$ and the velocity $V_2$ can be expressed in the following equation.

$$V_1\beta_1 = V_2\beta_2$$

Thereafter, the drum surface 2 has the latent image formed thereon which is further transferred on the copy paper, and then, the copy paper is developed and discharged from the copying machine in a similar manner as described before.

Although the optical system of the foregoing apparatus described above is for an illumination device scanning type of copying machine, it is possible to adapt the optical system to an original document scanning type copying machine in which the transparent support 3 with a document thereon is scanned over a fixed light source 7.

Figure 9:
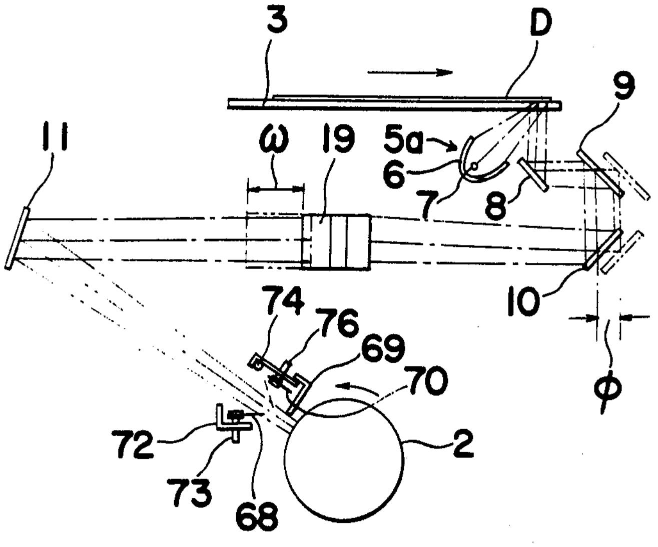
FIG. 9 is a similar view to FIG. 5, but particularly showing a another embodiment thereof.

Referring to FIG. 9, there is shown a schematic diagram of an optical system for an original scanning type copying apparatus in which the light source 7, reflector 6, and mirror 8 are fixedly mounted in the housing 1 at positions corresponding with the initial positions described above, while the mirrors 9 and 10 are movably mounted in the housing 1 for placing the mirrors 9 and 10 in advanced or retracted positions corresponding with the advanced and retracted initial positions described above. During the equal size copying operation, the mirrors 9 and 10 are placed in the advanced position shown by the full lines in FIG. 9, while during the reduced size copying operation, the mirrors 9 and 10 are placed in the retracted position shown by the chain lines in FIG. 9.

On the other hand, the transparent support 3 provided above the illumination device 5*a* is connected to means to move or scan it in the direction indicated by the arrow for sequentially projecting the light beam from the light source 7 on the original D. The velocity of the scan is equal to the speed of movement of the drum surface 2 during the equal size copying operation, and the velocity of the scan is $1/n$ times the speed of movement of the drum surface 2 during $n$ times size copying operation.

As is apparent from the foregoing descriptions, the electrophotographic copying machine of the present invention is particularly suitable for carrying out an equal size copying operation as well as a reduced size copying operation with the same light source having a predetermined amount of illumination distribution, while the distribution of the light projected on the drum surface can be maintained at a uniform amount regardless of the type of copying operation, i.e. whether it is an equal size copying operation or a reduced size copying operation, since the size of the opening of the slit can be changed corresponding to the change of the type of the copying operation. Accordingly, it is possible to obtain a clear and sharp image of the original on the copy paper without uneven distribution of the amount of exposure in both type of copying operations.

It is to be noted that the optical system of the full frame exposure type in which the photoreceptor surface has the latent image formed thereon all at once, i.e. without any scanning of the original or the illumination device, can also produce a clear and sharp image of the original on the copy paper by providing a suitable filter at a predetermined position in the optical path for maintaining a uniform distribution of the amount of exposure on the drum surface regardless of the type of copying operation, i.e. whether it is equal size copying operation or a reduced size copying operation.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. An electrophotographic copying machine of the type for producing copied images having the same size as or a different size from an original to be copied, said electrophotographic copying machine comprising:

(a) a recording member;

(b) optical means including slit defining means for projecting the image to be copied along an optical path onto said recording member;

(c) means for changing the magnification of the image projected onto said recording member by said optical means; and (d) adjusting means positioned in the optical path for adjusting the relative widths of the portions of the slit defined by said slit defining means in the direction along the length of the slit for causing the distribution of the amount of exposure of the image being projected on said recording member by said optical means for one magnification to be the same as the distribution of the amount of exposure for the other magnifications, whereby the distribution of the amount of exposure of the image projected on said recording member is maintained in a predetermined distribution along the length of the slit regardless of a change of magnification.

2. An electrophotographic copying machine as claimed in claim 1, wherein said adjusting means includes a plurality of adjusting members, at least one adjusting member being movable, in relation to the operation of said changing means, between a projected position in which said adjusting member projects into said optical path and a retracted position in which said adjusting member is retracted on of said optical path.

3. An electrophotographic copying machine as claimed in claim 2, wherein said adjusting member has a shape for reducing the width of said slit toward the opposite ends when said adjusting member is positioned in said projected position.

4. An electrophotographic copying machine of the type for producing copied images having the same size as or a different size from an original to be copied, said electrophotographic copying machine comprising:

(a) a recording member;

(b) optical means for projecting the image to be copied along an optical path onto said recording member;

(c) means for changing the magnification of the image projected onto said recording member by said optical means between a first size and a second size which is less than said first size; and (d) adjusting means movably positioned in the optical path for partially adjusting the amount of exposure of the image being projected on said recording member by said optical means, said adjusting means having a shape and being movable, in response to the operation of said changing means, between a retracted position in which said adjusting means is retracted out of said optical path and a projected position in which said adjusting means projects into said optical path for adjusting the distribution of the amount of exposure to that which is the same as the distribution of the amount of exposure when said adjusting means is in the retracted position, whereby the distribution of the amount of exposure of the image projected on said recording member is maintained in a predetermined distribution regardless of a change of magnification.

5. An electrophotographic copying machine as claimed in claim 4, wherein said adjusting means comprises a restricting member having a shape for restricting the amount of light projected onto the recording member and for decreasing the amount of exposure toward the peripheral edges of the image projected by said optical means in an amount for substantially equalizing the distribution of the amount of exposure of the projected image during copying at said second size with the distribution of the amount of exposure to the projected image during copying at said first size, said restricting member being moved to said projected position when said changing means is changed for copying at said second size and being moved to said retracted position when said changing means is changed for copying at said first size.

6. An electrophotographic copying machine of the type for producing copied images having the same size as or a different size from an original to be copied, said electrophotographic copying machine comprising:

(a) a recording member;
(b) a slit exposure type optical means including slit defining means for sequentially projecting through the slit defined by said slit defining means the image to be copied along an optical path onto said recording member;
(c) means for changing the magnification of the image projected onto said recording member by said optical means; and
(d) adjusting means movably positioned in the optical path for adjusting the relative widths of the portions of the slit in the direction along the length of the slit for causing the distribution of the amount of exposure of the image being projected on said recording member by said optical means for one magnification to be the same as the distribution of the amount of exposure for the other magnifications, whereby the distribution of the amount of exposure of the image projected on said recording member is maintained in a predetermined distribution along the length of the slit regardless of a change of magnification.

7. An electrophotographic copying machine as claimed in claim 6, where said adjusting means comprises means for changing the configuration of said slit along the line corresponding to a longitudinal direction thereof.

8. An electrophotographic copying machine as claimed in claim 6, wherein said adjusting means is provided adjacent to said recording member and comprises means for adjusting the configuration of said slit for reducing the width thereof towards the opposite ends of the slit.

9. An electrophotographic copying machine of the type for producing copied images having the same size or a different size from an original to be copied, said electrophotographic copying machine comprising:

(a) a recording member;
(b) slit exposure type optical means having a slit forming means end for sequentially projecting, through the slit, defined by said slit forming means an image of the original onto said recording member;
(c) means for changing the magnification of the image projected onto said recording member by said optical means between a first size and a second size which is less than said first size; and
(d) adjusting means movably positioned for movement into and out of the optical path adjacent said recording member and having a shape for adjusting the configuration of said slit in the longitudinal direction thereof and movable in correspondence with the operation of said changing means for adjusting the distribution of the amount of exposure along the longitudinal direction of said slit, for producing an even distribution of the amount of exposure along the longitudinal direction of said slit for copying at both sizes of the image on said recording means.

10. An electrophotographic copying machine as claimed in claim 9, wherein said adjusting means comprises:

(a) a restricting member movably mounted in said apparatus for movement into said optical path when said changing means is changed for copying at said second size and to withdraw from said optical path when said changing means is changed for copying at said first size; and
(b) means connected between said changing means and said restricting members for moving said restricting member in relation to the movement of said changing means, for moving said restricting member into and out of said optical path.

11. An electrophotographic copying machine of a type for producing copied images having the same size as or a different size from an original to be copied, said electrophotographic copying machine comprising, in combination:

(a) a recording member;
(b) means for scanning said original;
(c) lens means for sequentially projecting the image of said original along an optical path from said scanning means to said recording member, said lens means being movable in alignment with the optical axis thereof for changing the magnification of the image projected on said recording member;
(d) shifting means connected to at least said lens means for shifting said lens means in relation to the size of the image to be projected on said recording member;
(e) slit defining means in said optical path between said lens means and said recording member for shaping the projected image into the shape of a slit;
(f) slit control means adjacent said slit defining means, said slit control means being movable into the optical path between said original and said recording member for changing the shape of said slit to reduce the width thereof towards the opposite ends of the slit for maintaining the distribution of the amount of exposure of the image along the longitudinal direction of the slit on said recording member, when said lens means has been moved to change the magnification of the image, so that it is the same as the distribution prior to the change of magnification; and
(g) means for interconnecting said shifting means with said slit control means for moving said slit control means in relation to the movement of said shifting means when changing the position of said lens means for changing the magnification of the image, whereby the distribution of the amount of exposure of the image along the longitudinal direction of the slit on said recording member is maintained in a predetermined distribution regardless of a change in the magnification of the projected image.

12. An electrophotographic copying machine as claimed in claim 11 in which said shifting means includes driving means connected to said lens means for shifting said lens means, and said slit control means includes a rotatable shaft member and restricting member on said shaft member movable into the optical path between said original and said recording member when said shaft member is rotated for changing the shape of said slit, and said machine further comprises means for interconnecting said shifting means and said slit control means and including a rotatably mounted level member connected to said driving source and driving said restricting member when driven by said driving means.

* * * * *